(12) United States Patent
Mentovich et al.

(10) Patent No.: US 12,034,841 B2
(45) Date of Patent: *Jul. 9, 2024

(54) HYBRID QUANTUM KEY DISTRIBUTION LINK FOR AN OPTICAL TRANSCEIVER

(71) Applicant: Mellanox Technologies, Ltd., Yokneam (IL)

(72) Inventors: Elad Mentovich, Tel Aviv (IL); Itshak Kalifa, Bat Yam (IL); Ioannis (Giannis) Patronas, Piraeus (GR); Paraskevas Bakopoulos, Ilion (GR); Eyal Waldman, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,954

(22) Filed: Apr. 18, 2023

(65) Prior Publication Data

US 2023/0261860 A1 Aug. 17, 2023

Related U.S. Application Data

(63) Continuation of application No. 17/122,140, filed on Dec. 15, 2020, now Pat. No. 11,664,983.

(30) Foreign Application Priority Data

Sep. 22, 2020 (GR) .............................. 20200100576

(51) Int. Cl.
*H04L 9/08* (2006.01)
*H04B 10/70* (2013.01)

(52) U.S. Cl.
CPC ............ *H04L 9/0858* (2013.01); *H04B 10/70* (2013.01)

(58) Field of Classification Search
CPC ............................. H04L 9/0858; H04B 10/70
See application file for complete search history.

(56) References Cited

U.S. PATENT DOCUMENTS 5,757,912 A * 5/1998 Blow .................... H04L 9/0858
398/40
7,881,473 B2 2/2011 Wang et al.
(Continued)

OTHER PUBLICATIONS

Notice of Allowance issued Mar. 14, 2023, in pending U.S. Appl. No. 17/227,321.
(Continued)

*Primary Examiner* — Matthew Smithers
(74) *Attorney, Agent, or Firm* — Moore & Van Allen PLLC; Michael M. McCraw

(57) ABSTRACT

Embodiments are disclosed for a quantum key distribution enabled intra-datacenter network. An example system includes a first vertical cavity surface emitting laser (VCSEL), a second VCSEL and a network interface controller. The first VCSEL is configured to emit a first optical signal associated with data. The second VCSEL is configured to emit a second optical signal associated with quantum key distribution (QKD). Furthermore, the network interface controller is configured to manage transmission of the first optical signal associated with the first VCSEL and the second optical signal associated with the second VCSEL via an optical communication channel coupled to a network interface module.

20 Claims, 8 Drawing Sheets

(56) References Cited

U.S. PATENT DOCUMENTS

| | | | |
|---|---|---|---|
| 8,369,710 B2* | 2/2013 | Thiele | H04Q 11/0062 398/164 |
| 9,077,577 B1 | 7/2015 | Ashrafi et al. | |
| 9,356,780 B2 | 5/2016 | Tanizawa et al. | |
| 10,601,538 B2* | 3/2020 | Golcher Ugalde | H04B 10/541 |
| 11,240,013 B1 | 2/2022 | Vakili et al. | |
| 11,343,270 B1 | 5/2022 | Carter, Jr. et al. | |
| 11,451,308 B1 | 9/2022 | Bucklew et al. | |
| 11,644,983 B2* | 5/2023 | Lee | G06F 3/0655 711/154 |
| 2002/0067882 A1 | 6/2002 | Guilfoyle et al. | |
| 2003/0118282 A1 | 6/2003 | Tatum et al. | |
| 2004/0013437 A1 | 1/2004 | Wiltsey et al. | |
| 2004/0037496 A1* | 2/2004 | Pierce | G02B 6/4206 385/28 |
| 2004/0126072 A1 | 7/2004 | Hoon Lee et al. | |
| 2004/0202218 A1* | 10/2004 | Thornton | H01S 3/06716 372/50.1 |
| 2006/0245762 A1 | 11/2006 | Thiele et al. | |
| 2008/0137858 A1 | 6/2008 | Gelfond et al. | |
| 2008/0165957 A1 | 7/2008 | Kandasamy et al. | |
| 2008/0292102 A1 | 11/2008 | Wang et al. | |
| 2011/0129225 A1 | 6/2011 | Gostin et al. | |
| 2011/0150502 A1 | 6/2011 | Zhao et al. | |
| 2013/0101119 A1 | 4/2013 | Nordholt et al. | |
| 2016/0218867 A1* | 7/2016 | Nordholt | H04L 9/0852 |
| 2017/0040772 A1 | 2/2017 | Raz et al. | |
| 2017/0214525 A1 | 7/2017 | Zhao et al. | |
| 2018/0069631 A1 | 3/2018 | Ashrafi et al. | |
| 2020/0044836 A1 | 2/2020 | Kim et al. | |
| 2021/0231879 A1 | 7/2021 | Mathai et al. | |
| 2022/0006627 A1 | 1/2022 | Ko et al. | |
| 2023/0306142 A1* | 9/2023 | Meinholz | G06F 21/79 713/190 |

OTHER PUBLICATIONS

Chen et al.; "A Novel Picoseconds Optical Pulse Source for Free-Space Decoy-State Quantum Key Distribution", 2013, IEEE, pp. 1-4.

Vest et al.; "Design and Evaluation of a Handheld Quantum Key Distribution Sender module", 2015, IEEE Journal of Selected topics in Quantum Electronics, vol. 21, No. 3, pp. 1-7.

Jiang et al.; Secure key distribution applications of chaotic lasers:, 2016, Proc. of SPIE vol. 10026, pp. 1-8.

* cited by examiner

HYBRID QUANTUM KEY DISTRIBUTION LINK FOR AN OPTICAL TRANSCEIVER

CROSS-REFERENCE TO RELATED APPLICATIONS

This application is a continuation of U.S. application Ser. No. 17/122,140, filed Dec. 15, 2020, which application claims priority to Greek Application No. 20200100576, filed Sep. 22, 2020, the content of which applications are hereby incorporated by reference herein in their entirety.

TECHNOLOGICAL FIELD

Embodiments of the present invention relate generally to quantum key distribution for optical transceivers.

BACKGROUND

Traditional security protocols for network devices generally employ software that introduces latency to computational processes and/or communications associated with the network devices. For example, traditional security protocols for network devices include traditional key exchange protocols such as a Diffie-Hellman key exchange protocol, a Rivest-Shamir-Adleman (RSA) key exchange protocol, etc.

BRIEF SUMMARY

Example embodiments of the present invention relate generally to system(s), method and apparatus to facilitate quantum key distribution for optical transceivers. The details of some embodiments of the subject matter described in this specification are set forth in the accompanying drawings and the description below. Other features, aspects, and advantages of the subject matter will become apparent from the description, the drawings, and the claims.

In an embodiment, a system comprises a first vertical cavity surface emitting laser (VCSEL), a second VCSEL, and a network interface controller. The first VCSEL is configured to emit a first optical signal associated with data. The second VCSEL is configured to emit a second optical signal associated with quantum key distribution (QKD). The network interface controller is configured to manage transmission of the first optical signal associated with the first VCSEL and the second optical signal associated with the second VCSEL via an optical communication channel coupled to a network interface module.

In some embodiments, the network interface controller is configured to manage transmission of the first optical signal and the second optical signal based on a filter configured to filter the second optical signal. In some embodiments, the network interface controller is configured to select the first optical signal or the second optical signal for transmission as an output optical signal via the optical communication channel.

In some embodiments, the network interface controller is configured to measure an electrical characteristic of a photodiode of the second VCSEL. Furthermore, in some embodiments, the network interface controller is configured to manage the transmission of the first optical signal and the second optical signal based on the electrical characteristic measured.

In some embodiments, the network interface controller is configured to compare measurement of states of qubits associated with the second optical signal to facilitate the transmission of the first optical signal and the second optical signal. In some embodiments, the network interface controller is configured to perform error correction with respect to the first optical signal to facilitate the transmission of the first optical signal and the second optical signal. In some embodiments, the network interface controller is configured to manage the transmission of the first optical signal and the second optical signal based on a BB84 QKD protocol, a T12 QKD protocol, or a coherent one way (COW) QKD protocol.

In some embodiments, the network interface controller is configured to perform a first QKD communication process associated with the second VCSEL. Furthermore, in some embodiments, the system further comprises a graphics processing unit configured to perform a second QKD communication process associated with the second VCSEL.

In some embodiments, the system further comprises a QSFP device that comprises the first VCSEL and the second VCSEL. In some embodiments, the system is a transceiver device.

In another embodiment, a system comprises a first network interface module and a network interface controller. The first network interface module comprises a first VCSEL and a second VCSEL. The first VCSEL is configured to emit a first optical signal associated with data. The second VCSEL is configured to emit a second optical signal associated with QKD. The network interface controller is configured to manage transmission of the first optical signal associated with the first VCSEL and the second optical signal associated with the second VCSEL via an optical communication channel coupled to a second network interface module.

In some embodiments, the first network interface module is a quad small form-factor pluggable (QSFP) network interface module. In some embodiments, the first network interface module further comprises a filter configured to filter configured to filter the second optical signal to facilitate the transmission of the first optical signal or the second optical signal via the optical communication channel. In some embodiments, the network interface controller is configured to select the first optical signal or the second optical signal for transmission as an output optical signal via the optical communication channel.

In some embodiments, the network interface controller is configured to measure an electrical characteristic of a photodiode of the second VCSEL. Furthermore, in some embodiments, the network interface controller is configured to manage the transmission of the first optical signal and the second optical signal based on the electrical characteristic measured.

In some embodiments, the network interface controller is configured to compare measurement of states of qubits associated with the second optical signal to facilitate the transmission of the first optical signal and the second optical signal. In some embodiments, the network interface controller is configured to perform error correction with respect to the first optical signal to facilitate the transmission of the first optical signal and the second optical signal. In some embodiments, the network interface controller is configured to manage the transmission of the first optical signal and the second optical signal based on a BB84 QKD protocol, a T12 QKD protocol, or a COW QKD protocol.

In some embodiments, the network interface controller is configured to perform a first QKD communication process associated with the second VCSEL. Furthermore, in some embodiments, the system further comprises a graphics processing unit configured to perform a second QKD communication process associated with the second VCSEL. In some embodiments, the system is a transceiver device.

In yet another embodiment, a method is provided. The method includes controlling emission of a first optical signal associated with data via a first VCSEL of a network interface module. The method also includes controlling emission of a second optical signal associated with QKD via a second VCSEL of the network interface module. The method also includes managing transmission of the first optical signal and the second optical signal via an optical communication channel coupled to the network interface module.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Figure 1:
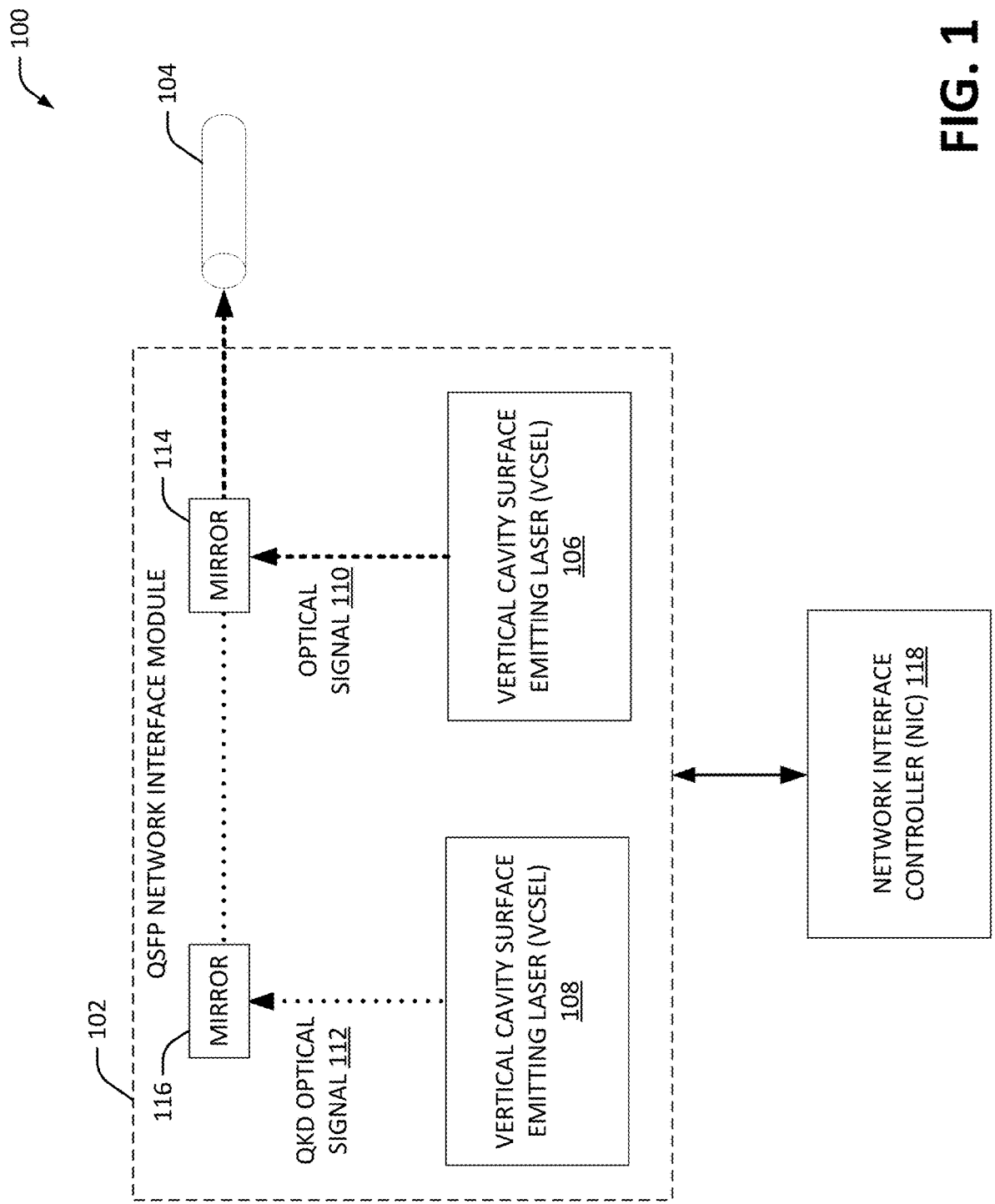
Figure 2:
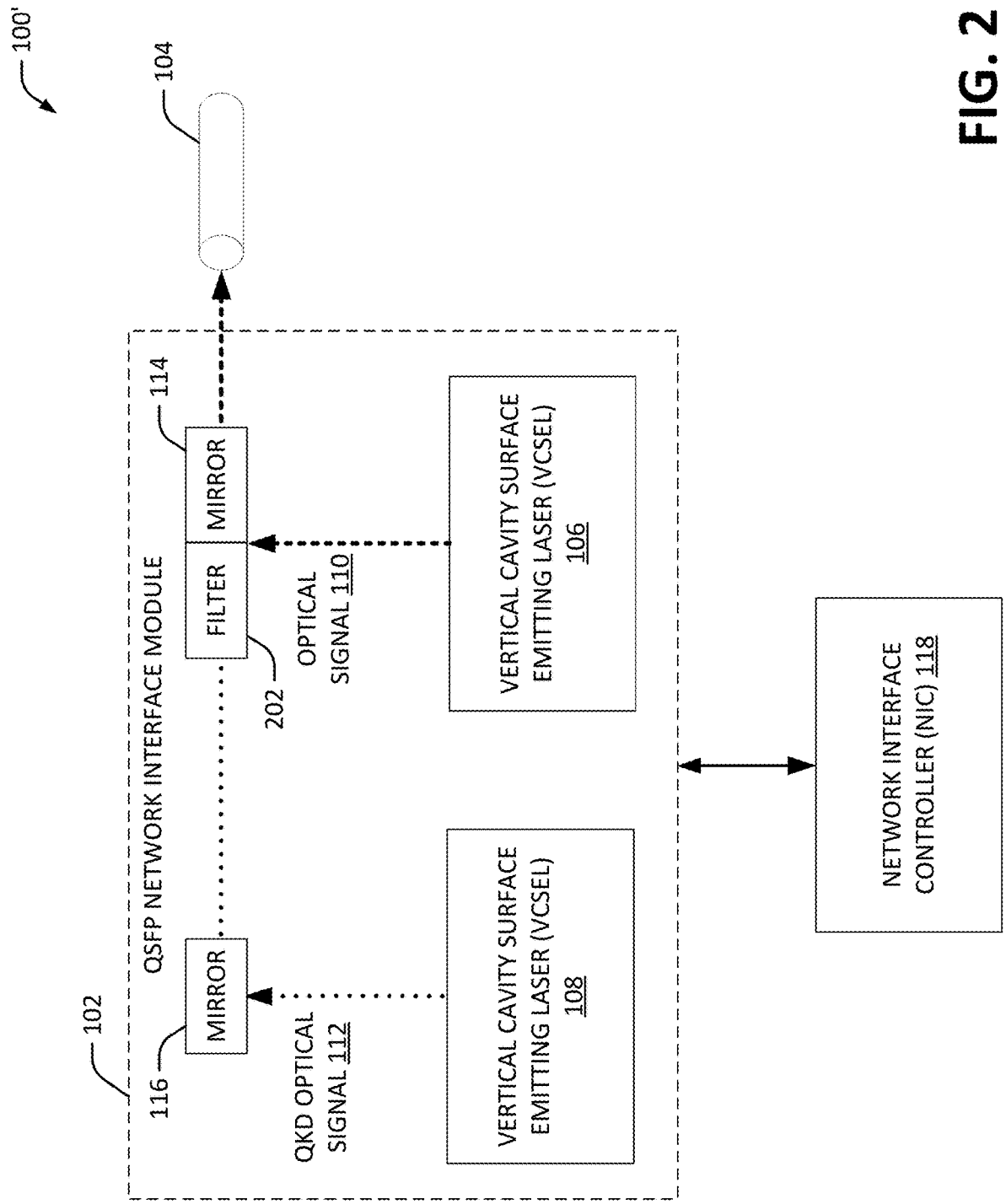
Figure 3:
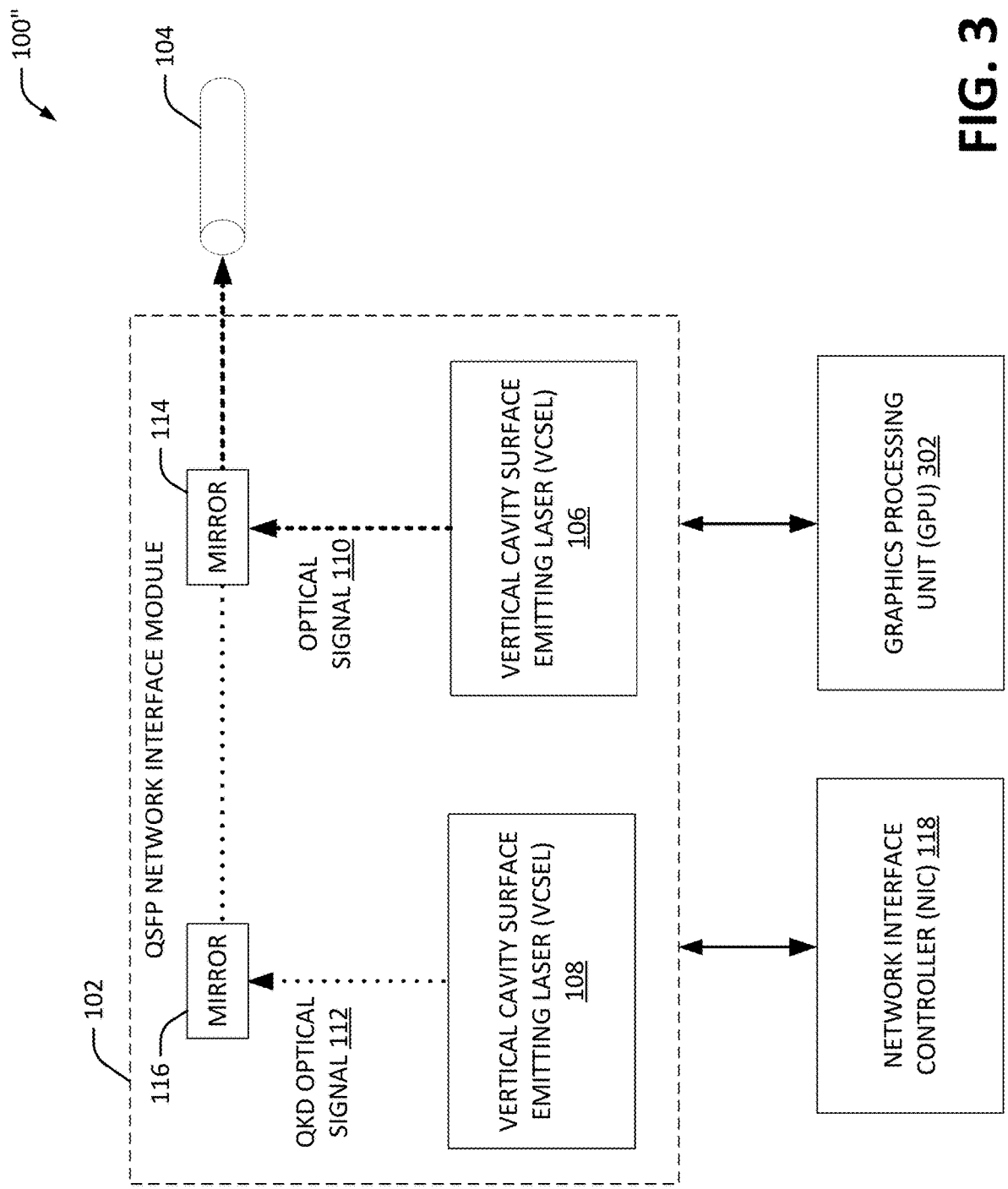
Figure 4:
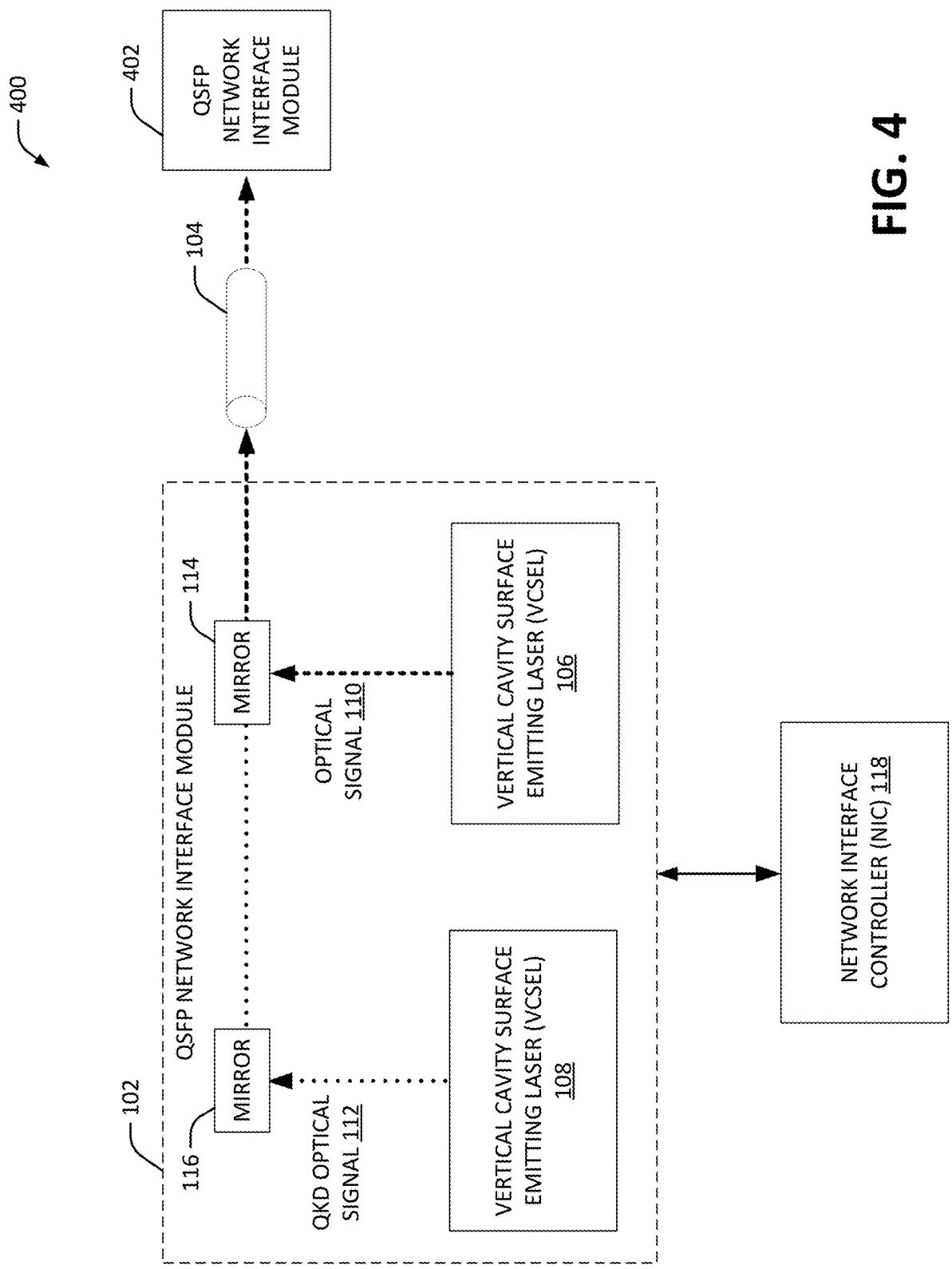
Figure 5:
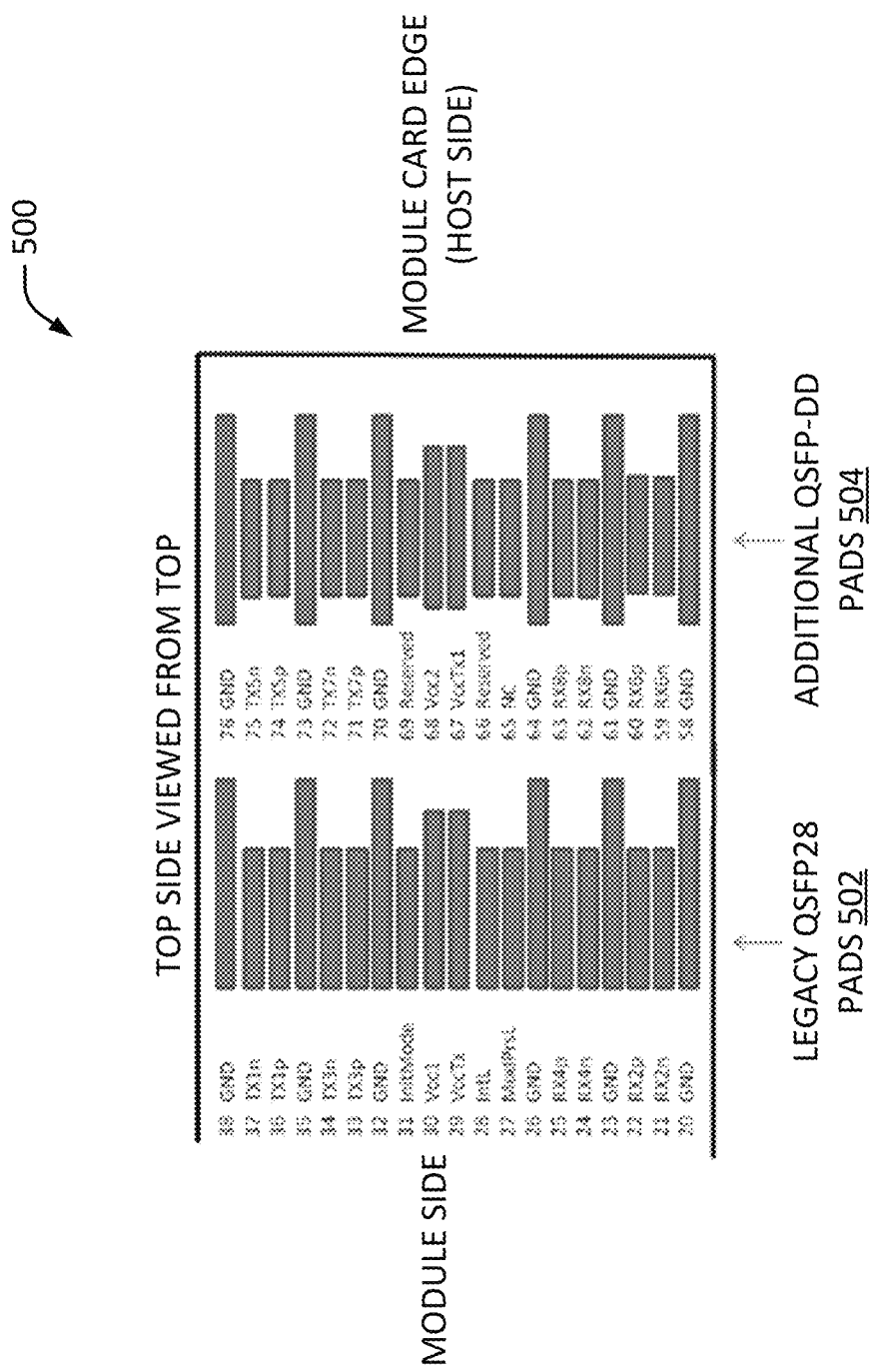
Figure 6:
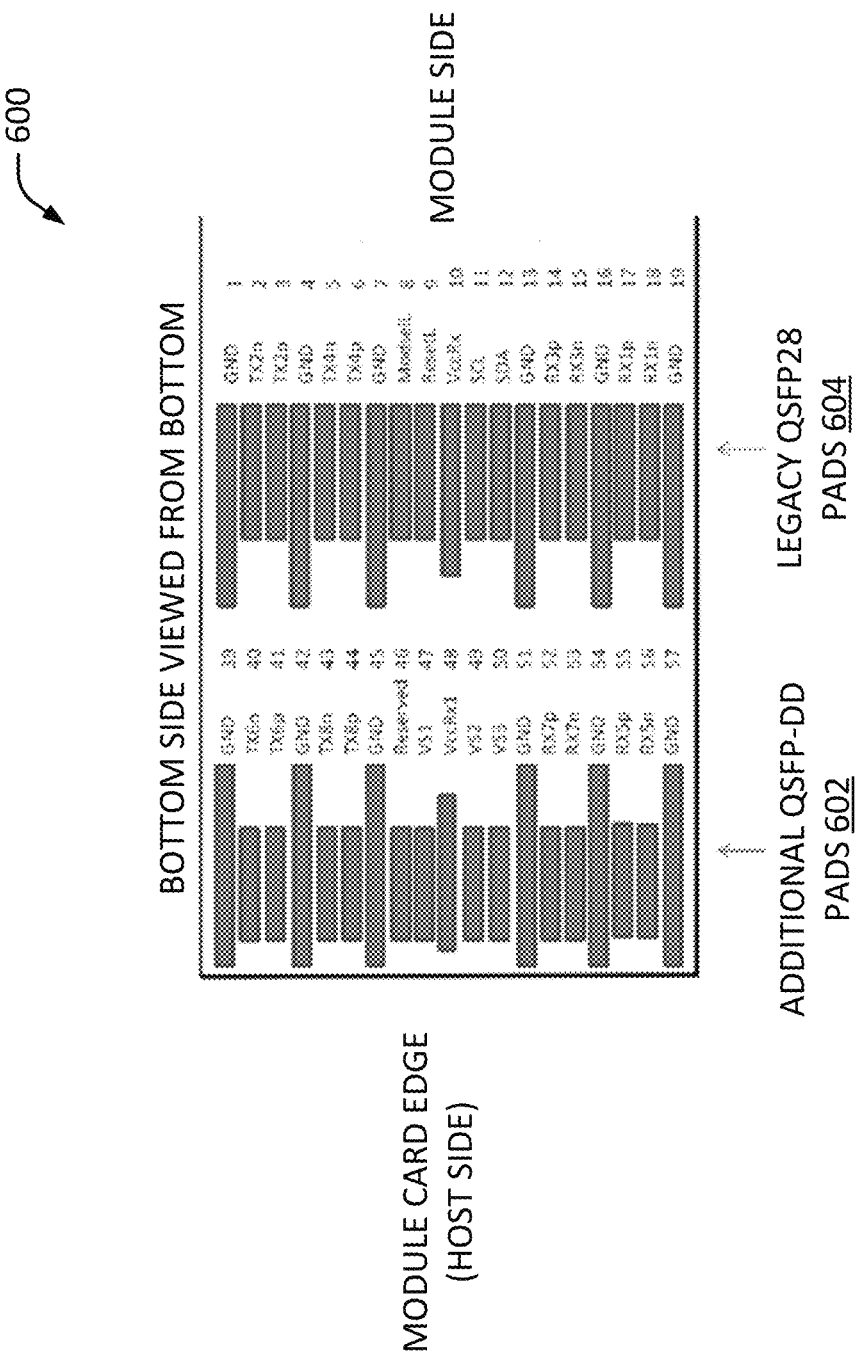
Figure 7:
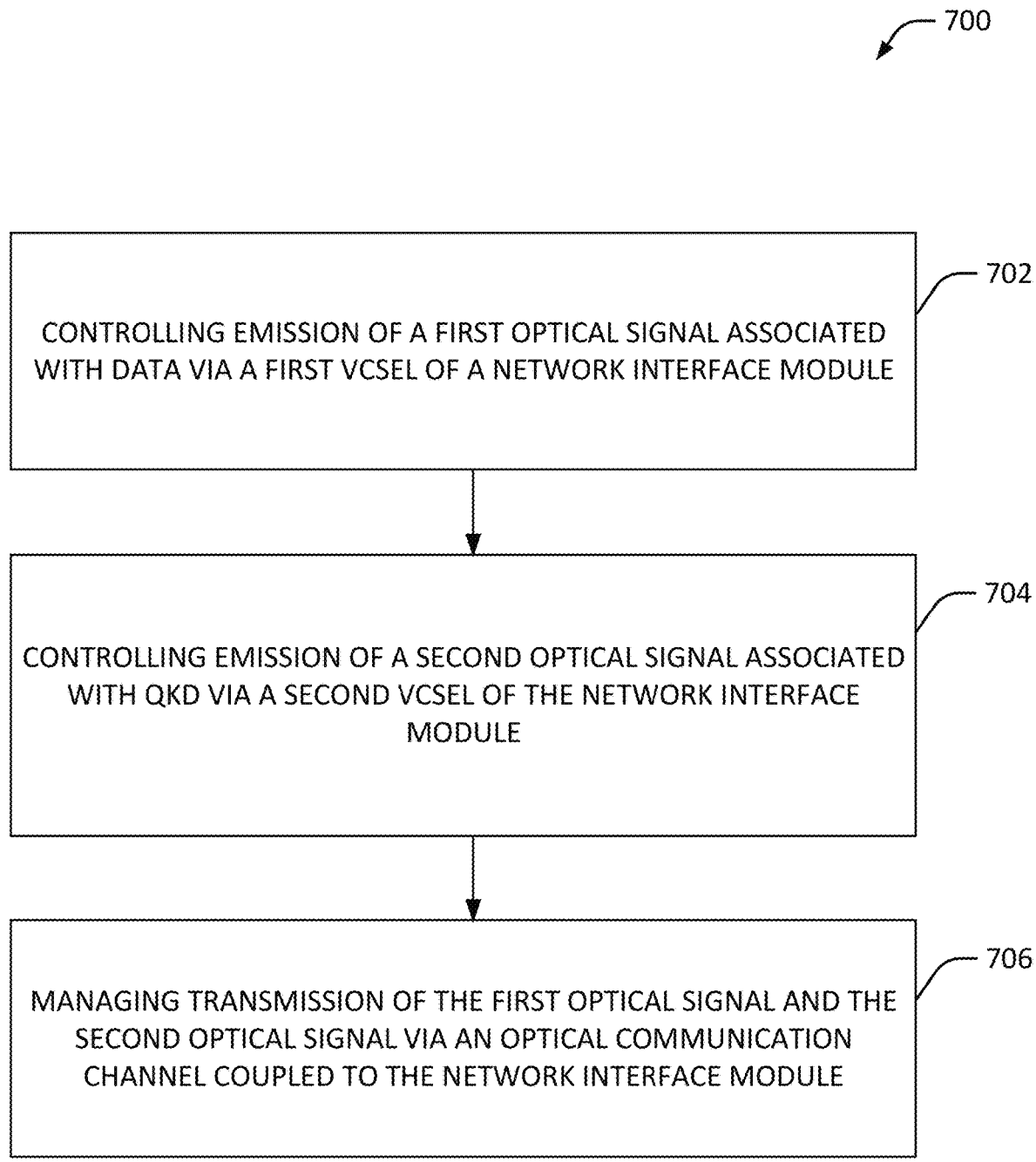
Figure 8:
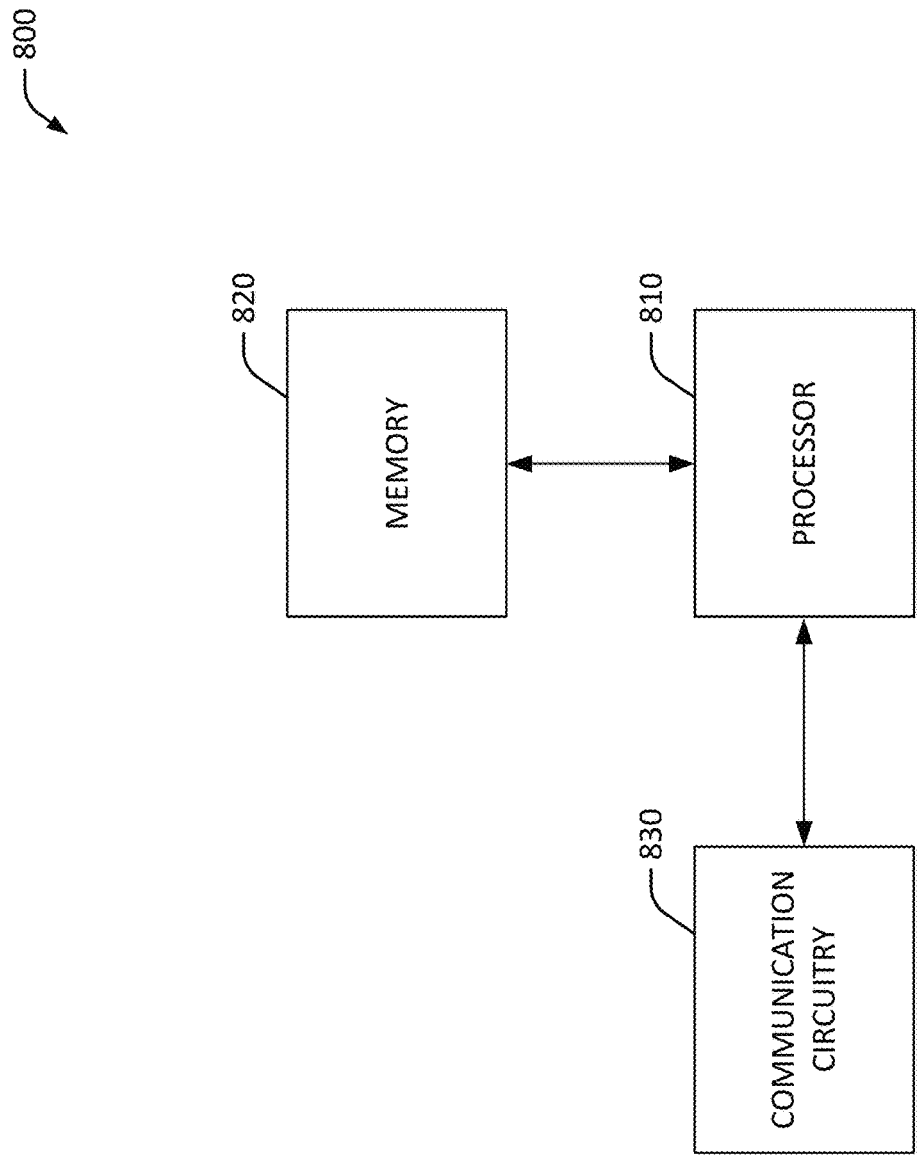

Having thus described the disclosure in general terms, reference will now be made to the accompanying drawings, which are not necessarily drawn to scale, and wherein:

FIG. 1 illustrates an exemplary system that facilitates a hybrid quantum key distribution (QKD) link, in accordance with one or more embodiments of the present disclosure;

FIG. 2 illustrates another exemplary system that facilitates a hybrid QKD link, in accordance with one or more embodiments of the present disclosure;

FIG. 3 illustrates yet another exemplary system that facilitates a hybrid QKD link, in accordance with one or more embodiments of the present disclosure;

FIG. 4 illustrates yet another exemplary system that facilitates a hybrid QKD link, in accordance with one or more embodiments of the present disclosure;

FIG. 5 illustrates a module pad layout that facilitates a hybrid QKD link, in accordance with one or more embodiments of the present disclosure;

FIG. 6 illustrates another module pad layout that facilitates a hybrid QKD link, in accordance with one or more embodiments of the present disclosure;

FIG. 7 is a flowchart illustrating an example method for facilitating a hybrid QKD link, in accordance with one or more embodiments of the present disclosure; and FIG. 8 illustrates an example computing system that may be embedded in the communication system, in accordance with one or more embodiments of the present disclosure.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. Thus, use of any such terms should not be taken to limit the spirit and scope of embodiments of the present invention.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Traditional security protocols for network devices generally employ software that introduces latency to computational processes and/or communications associated with the network devices. For example, traditional security protocols for network devices include traditional key exchange protocols such as a Diffie-Hellman key exchange protocol, a Rivest-Shamir-Adleman (RSA) key exchange protocol, etc. that introduce latency to computational processes and/or communications associated with the network devices. Furthermore, with traditional security protocols, security vulnerabilities for data transmitted via a communication channel still exist. For example, with traditional key exchange protocols, it is possible to obtain unauthorized access to data transmitted via a communication channel (e.g., data transmitted using classical computing techniques) since it is generally difficult to detect when the communication channel is being monitored and/or accessed by an unauthorized entity. Moreover, traditional security protocols are generally based on mathematical encryption with computational complexity (e.g., prime number factorization) that can be solved with quantum computing in a shorter amount of time as compared to classical computing.

Thus, to address these and/or other issues, a hybrid quantum key distribution link for an optical transceiver is disclosed herein. Quantum Key Distribution (QKD) is a technology that provides security to an optical communication channel via quantum mechanics. In an aspect, QKD employs photons to exchange one or more keys (e.g., one or more cryptographic keys) via an optical communication channel. A vertical cavity surface emitting laser (VCSEL) is a semiconductor laser diode that emits an optical signal (e.g., an optical beam) vertically with respect to a top surface of the VCSEL. According to one or more embodiments, a network interface module can include a redundant VCSEL to facilitate improved security associated with QKD for an optical communication channel. For example, in one or more embodiments, a network interface module can include a first VCSEL (e.g., a first VCSEL hardware device) that emits an optical signal associated with data to be transmitted via an optical communication channel and a second VCSEL (e.g., a second VCSEL hardware device) that emits another optical signal associated with QKD to facilitate encryption of the data associated with the first VCSEL. In one or more embodiments, the second VCSEL can be configured for quantum encryption based on quantum dot gain media. As such, the second VCSEL can be a source for QKD. In an embodiment, the network interface module can be a quad small form-factor pluggable (QSFP) network interface module.

According to one or more embodiments, a network interface controller (NIC) can perform analysis (e.g., real-time analysis) with respect to the second VCSEL to facilitate managing transmission of the optical signal associated with the first VCSEL and/or the other optical signal associated with the second VCSEL. For example, in one or more embodiments, the NIC can measure one or more characteristics associated with a photodiode of the second VCSEL to facilitate managing transmission of the optical signal associated with the first VCSEL and/or the other optical signal associated with the second VCSEL. According to one or more embodiments, a graphics processing unit (GPU) and/or another accelerator hardware unit can perform one or more computational tasks associated with analysis (e.g., real-time analysis) of the second VCSEL. In one or more embodiments, one or more pins of the network interface module can be employed for transferring information related to one or more QKD keys via the optical communication channel.

As such, a low cost QKD device can be provided for improved security for an optical communication channel. In an embodiment, the network interface module that includes the redundant VCSEL can be employed for an intra-data-center connection. In another embodiment, the network interface module that includes the redundant VCSEL can be employed for high performance computing connection. However, it is to be appreciated that, in certain embodiments, the network interface module that includes the redundant VCSEL can be employed in another type of networking environment and/or another type of communications network. Moreover, according to one or more embodiments, hardware and/or intelligence to facilitate QKD technology can be implemented via a network interface module. For instance, according to one or more embodiments, QKD optics and classical optics can be implemented in a compact pluggable network interface module. According to one or more embodiments, the network interface module can be backwards compatible with classical network device technologies and/or can provide QKD capability for a network device (e.g., a NIC). Furthermore, as compared to conventional security protocols (e.g., conventional key exchange protocols), embodiments disclosed herein provide for improved security for a network interface, improved performance for a network interface module, and/or improved efficiency for a network interface module.

FIG. 1 illustrates a system 100 that facilitates a hybrid QKD link according to one or more embodiments of the present disclosure. For instance, in one or more embodiments, the system 100 implements a hybrid QKD link for a transceiver device (e.g., an optical transceiver). The system 100 includes a QSFP network interface module 102. The QSFP network interface module 102 can be, for example, a transceiver device (e.g., an optical transceiver) that facilitates fiber optic communication. In one or more embodiments, the QSFP network interface module 102 can be a pluggable optical transceiver with a set of pins to facilitate connection with an optical communication channel 104. The optical communication channel 104 can be, for example, a fiber optic communication channel (e.g., a transparent fiber optic connection, a fiber optic wire, etc.) that transmits pulses of infrared light. In an embodiment, the optical communication channel 104 includes a single optical communication channel (e.g., a single fiber optic wire). In another embodiment, the optical communication channel 104 includes two or more optical communication channels (e.g., two or more fiber optic wires). For example, in an embodiment, the optical communication channel 104 can include one or more fiber optic wires (e.g., four parallel fiber optic wires) for transmission of an optical signal (e.g., the optical signal 110), one or more fiber optic wires (e.g., four parallel fiber optic wires) for reception of an optical signal, and a fiber optic wire for transmission of a QKD signal (e.g., the QKD optical signal 112). In another embodiment, the optical communication channel 104 can include a single fiber optic wire where respective signals for classical channels with respective wavelengths (e.g., four classical channels with respective wavelengths are multiplexed) and a quantum channel (e.g., a fifth channel with a respective wavelength) are multiplexed and transmitted via the single fiber optic wire. In another embodiment, the optical communication channel 104 can include two or more fiber optic wires (e.g., four parallel fiber optic wires) where a quantum channel is implemented in a fiber optic wire from the two or more fiber optic wires. In another embodiment, the optical communication channel 104 can include a first fiber optic wire where respective signals for classical channels with respective wavelengths (e.g., four classical channels with respective wavelengths are multiplexed) are multiplexed and transmitted via the first fiber optic wire, and a second fiber optic wire where signals for a quantum channel (e.g., a fifth channel with a respective wavelength) are transmitted via the second fiber optic wire. In another embodiment, the optical communication channel 104 can include additionally or alternatively include a fiber bundle. However, it is to be appreciated that, in certain embodiments, the optical communication channel 104 can be implemented in a different manner to facilitate communication of the optical signal 110 and/or the QKD optical signal 112.

In an embodiment, the QSFP network interface module 102 includes at least a VCSEL 106 (e.g., a first VCSEL) and a VCSEL 108 (e.g., a second VCSEL). In one or more embodiments, the VCSEL 106 can be configured to emit an optical signal 110. The optical signal 110 can be, for example, a first optical signal associated with data for transmission via the optical communication channel 104. For example, in one or more embodiments, the optical signal 110 can be an electromagnetic signal that transmits data at 10 G, 25 G, 40 G, 50 G, 100 G, 200 G, 400 G or another data speed via the optical communication channel 104. In one or more embodiments, the VCSEL 106 can emit the optical signal 110 at a particular wavelength (e.g., 850 nm or another wavelength). In an embodiment, the VCSEL 106 is a semiconductor laser diode that emits the optical signal 110 vertically with respect to a top surface of the VCSEL 106. For example, in one or more embodiments, the VCSEL 106 can include a photodiode, a set of mirrors (e.g., a set of distributed Bragg reflector mirrors) parallel to a wafer surface, one or more oxide layers, a gain region, and/or a laser cavity (e.g., an active region) to facilitate generation of a laser light for the optical signal 110. In one or more embodiments, the set of mirrors (e.g., the set of distributed Bragg reflector mirrors) of the VCSEL 106 can include a set of layers with alternating high refractive indices and low refractive indices to facilitate generation of a laser light for the optical signal 110. In a non-limiting example, the VCSEL 106 can be associated with 4× fiber channel data links. In one or more embodiments, an optical path of the optical signal 110 can include a mirror 114 to facilitate transmission of the optical signal 110 via the optical communication channel 104. For example, the mirror 114 can be an optical path component (e.g., a reflective surface) that redirects and/or guides the optical signal 110 to the optical communication channel 104.

Additionally, in one or more embodiments, the VCSEL 108 can be configured to emit a QKD optical signal 112. The QKD optical signal 112 can be, for example, a second optical signal associated with QKD to facilitate encryption of the data associated with the optical signal 110. In an aspect, the VCSEL 108 can be a redundant VCSEL in the QSFP network interface module 102 to provide security for the optical communication channel 104 via one or more QKD protocols. For instance, in one or more embodiments, the VCSEL 108 can be a redundant VCSEL in the QSFP network interface module 102 to provide a source for one or more quantum keys (e.g., one or more quantum keys associated with entangled photons) for transmission via the optical communication channel 104. In one or more embodiments, the VCSEL 108 can provide quantum encryption based on a set of quantum dots employed as a gain laser media (e.g., a source of optical gain) for the VCSEL 108. In one or more embodiments, the VCSEL 108 can emit the QKD optical signal 112 at a greater wavelength than the optical signal 110. For example, in a non-limiting embodiment, the VCSEL 108 can emit the QKD optical signal 112 at a wavelength (e.g., wavelength $\lambda 2$) that is twice as long as a wavelength (e.g., wavelength $\lambda 1$) of the optical signal 110. In an embodiment, the VCSEL 108 is a semiconductor laser diode that emits the QKD optical signal 112 vertically with respect to a top surface of the VCSEL 108. For example, in one or more embodiments, the VCSEL 108 can include a photodiode and set of mirrors (e.g., a set of distributed Bragg reflector mirrors) parallel to a wafer surface, one or more oxide layers, a gain region, and/or a laser cavity (e.g., an active region) to facilitate generation of a laser light for the QKD optical signal 112. In one or more embodiments, the set of mirrors (e.g., the set of distributed Bragg reflector mirrors) of the VCSEL 108 can include a set of layers with alternating high refractive indices and low refractive indices to facilitate generation of a laser light for the QKD optical signal 112. In an embodiment, the VCSEL 106 can be a single mode VCSEL configured for classical optical communication and the VCSEL 108 can be a single model VCSEL configured for QKD optical communication. For example, in an embodiment associated with a BB84 QKD protocol, two single mode VCSELs transmitting at non-orthogonal polarizations can be employed. In another embodiment associated with a BB84 QKD protocol, one single mode VCSEL and a polarization scrambler can be employed. In one or more embodiments, an optical path of the QKD optical signal 112 can include a mirror 116 to facilitate transmission of the QKD optical signal 112 via the optical communication channel 104. For example, the mirror 116 can be an optical path component (e.g., a reflective surface) that redirects and/or guides the QKD optical signal 112 to the optical communication channel 104. In one or more embodiments, by employing the VCSEL 106 and the VCSEL 108, the optical communication channel 104 can be a hybrid QKD link that facilitates transmission of the optical signal 110 and the QKD optical signal 112. It is to be appreciated that, in certain embodiments, the QSFP network interface module 102 can include more than two VCSELs. For example, in certain embodiments, the QSFP network interface module 102 can additionally include one or more additional VCSELs associated with classical optical communication and/or one or more additional VCSELs associated with QKD. Moreover, in certain embodiments, both the VCSEL 106 and the VCSEL 108 can be employed for QKD.

In one or more embodiments, the system 100 additionally includes a NIC 118. In an embodiment, the NIC 118 can be coupled (e.g., physically coupled and/or communicatively coupled) to the QSFP network interface module 102. In another embodiment, the QSFP network interface module 102 can include the NIC 118. The NIC 118 can be configured to manage transmission of the optical signal 110 and/or the QKD optical signal 112 via the optical communication channel 104. In an embodiment, the NIC 118 can be configured to select the optical signal 110 or the QKD optical signal 112 for transmission via the optical communication channel 104. For example, in an embodiment, the NIC 118 can be configured to manage timing of transmission of the optical signal 110 and/or the QKD optical signal 112 over a single optical communication channel (e.g., a single fiber optic wire) of the optical communication channel 104. In another embodiment, the NIC 118 can be configured to select the optical signal 110 for transmission via a first optical communication channel (e.g., a first fiber optic wire) of the optical communication channel 104 and the QKD optical signal 112 for transmission via a second optical communication channel (e.g., a second fiber optic wire) of the optical communication channel 104.

In one or more embodiments, the NIC 118 can be configured to manage emission of the QKD optical signal 112 to facilitate transmission of one or more quantum keys (e.g., one or more QKD keys) via the optical communication channel 104. For example, in one or more embodiments, the NIC 118 can be configured to manage one or more inputs provided to the VCSEL 108 and/or one or more settings for the VCSEL 108 to transmission of one or more quantum keys (e.g., one or more QKD keys) via the optical communication channel 104. In an embodiment associated with a BB84 QKD protocol, the NIC 118 can select which VCSEL to transmit (or the NIC 118 can control a state of the polarization scrambler) to facilitate emission of an optical signal at an appropriate polarization. In one or more embodiments, control from the NIC 118 to the QSFP network interface module 102 can be realized based on an electrical lane control signal and/or by sending one or more different data streams to each VCSEL of the QSFP network interface module 102. In an embodiment associated with a protocol that employs time-bin encoding (e.g., a COW QKD protocol), the NIC 118 can drive the VCSEL 106 and/or the VCSEL 108 with the appropriate data. In one or more embodiments, the NIC 118 can be configured to perform one or more quantum processes (e.g., quantum processing) and/or quantum programming associated with the VCSEL 108. In one or more embodiments, the NIC 118 can be configured to select either the VCSEL 106 or the VCSEL 108 for transmission of a respective optical signal (e.g., the optical signal 110 or the QKD optical signal 112). Additionally or alternatively, in one or more embodiments, the NIC 118 can determine a polarization state (e.g., control a state of a polarization scrambler) for the VCSEL 106 and/or the VCSEL 108. In one or more embodiments, the NIC 118 can transmit one or more control signal (e.g., one or more electrical control signals) to the VCSEL 106 and/or the VCSEL 108 to facilitate transmission of the optical signal 110 and/or the QKD optical signal 112. In one or more embodiments, the NIC 118 can additionally or alternatively configure the VCSEL 106 and/or the VCSEL 108 with certain data to facilitate transmission of the optical signal 110 and/or the QKD optical signal 112. In one or more embodiments, the NIC 118 can additionally or alternatively configure the VCSEL 108 based on time-bin encoding to facilitate encoding of qubit information associated with the QKD optical signal 112.

In one or more embodiments, the NIC 118 can be configured to measure an electrical characteristic of a photodiode of the VCSEL 108. Furthermore, in one or more embodiments, the NIC 118 can be configured to manage the transmission of the optical signal 110 and/or the QKD optical signal 112 based on the electrical characteristic measured. In one or more embodiments, the NIC 118 can be configured to compare measurement of states of qubits associated with the QKD optical signal 112 to facilitate the transmission of the optical signal 110 and/or the QKD optical signal 112. In one or more embodiments, the NIC 118 can be configured to perform error correction, sifting and/or privacy amplification with respect to the optical signal 110 to facilitate the transmission of the optical signal 110 and/or the QKD optical signal 112. In one or more embodiments, the NIC 118 can be configured to manage the transmission of the optical signal and/or the QKD optical signal 112 based on a BB84 QKD protocol, a T12 QKD protocol, a coherent one way (COW) QKD protocol, and/or another QKD protocol. For example, in one or more embodiments, the NIC 118 can configure the VCSEL 108 for transmission of the QKD optical signal 112 based on a BB84 QKD protocol, a T12 QKD protocol, a COW QKD protocol, and/or another QKD protocol.

FIG. 2 illustrates a system 100' that facilitates a hybrid QKD link according to one or more embodiments of the present disclosure. The system 100' illustrates an exemplary embodiment associated with the system 100. The system 100' includes the QSFP network interface module 102, the optical communication channel 104, and/or the NIC 118. In an embodiment, the QSFP network interface module 102 includes the VCSEL 106, the VCSEL 108, the mirror 114, the mirror 116 and/or a filter 202. In one or more embodiments, the NIC 118 can be configured manage transmission of the optical signal 110 and/or the QKD optical signal 112 based on the filter 202. In an embodiment, the filter 202 can be configured to filter the QKD optical signal 112. For instance, in one or more embodiments, the filter 202 can be configured to filter an optical signal with a wavelength (e.g., wavelength λ2) that corresponds to a wavelength (e.g., wavelength λ2) of the QKD optical signal 112. In an example, the filter 202 can be configured to filter optical signals with a wavelength λ2 that corresponds to the QKD optical signal 112. In one or more embodiments, the filter 202 can be an optical filter that selectively transmits and/or filters different wavelengths. In one or more embodiments, the NIC 118 can control filtering by the filter 202. For example, in one or more embodiments, the NIC 118 can be configured to control the filter 202 to selectively filter the wavelength (e.g., wavelength λ2) of the QKD optical signal 112 or not. In one or more embodiments, the filter 202 can be located in an optical path of the optical signal 110 and/or the QKD optical signal 112. In one or more embodiments, the filter 202 can be coupled to the mirror 114 that provides an output optical signal (e.g., the optical signal 110 and/or the QKD optical signal 112) to the optical communication channel 104. In an embodiment, the filter 202 can be a thin film filter. In another embodiment, the filter 202 can be configured based on a prism or grating. In one or more embodiments, the filter 202 can be combined with a beam-forming element (e.g., a microelectromechanical systems (MEMS) mirror or a liquid crystal on silicon (LCOS) display) to, for example, facilitate dynamic alteration of one or more portions of the filter 202.

FIG. 3 illustrates a system 100" that facilitates a hybrid QKD link according to one or more embodiments of the present disclosure. The system 100" illustrates an exemplary embodiment associated with the system 100. The system 100" includes the QSFP network interface module 102, the optical communication channel 104, the NIC 118, and/or a GPU 302. In an embodiment, the QSFP network interface module 102 includes the VCSEL 106, the VCSEL 108, the mirror 114, and/or the mirror 116. In certain embodiments, the QSFP network interface module 102 additionally includes the filter 202. In an embodiment, the GPU 302 can be coupled (e.g., physically coupled and/or communicatively coupled) to the QSFP network interface module 102. In another embodiment, the QSFP network interface module 102 can include the GPU 302. In one or more embodiments, the GPU 302 can be employed in combination with the NIC 118 to manage transmission of the optical signal 110 and/or the QKD optical signal 112 via the optical communication channel 104. For example, in an embodiment, the NIC 118 can be configured to perform a first QKD communication process associated with the VCSEL 108 and the GPU 302 can be configured to perform a second QKD communication process associated with the VCSEL 108. Additionally or alternatively, in an embodiment, the NIC 118 can be configured to perform a first communication process associated with the VCSEL 106 and the GPU 302 can be configured to perform a second communication process associated with the VCSEL 106. Additionally or alternatively, in an embodiment, the NIC 118 can be configured to perform a first error correction process associated with the optical signal 110 and the GPU 302 can be configured to perform a second error correction process associated with the optical signal 110. In certain embodiments, the GPU 302 can be configured to perform error correction, sifting and/or privacy amplification (e.g., rather than the NIC 118 performing error correction, sifting and/or privacy amplification) with respect to the optical signal 110 to facilitate the transmission of the optical signal 110 and/or the QKD optical signal 112. In certain embodiments, the GPU 302 can be configured to perform at least a portion of one or more quantum processes (e.g., quantum processing) and/or quantum programming associated with the VCSEL 108. In certain embodiments, the GPU 302 can be configured to perform one or more other computational tasks associated with the VCSEL 106 and/or the VCSEL 108. In certain embodiments, the GPU 302 can be configured as another type of accelerator hardware unit that performs one or more computational tasks associated with the VCSEL 106 and/or the VCSEL 108.

FIG. 4 illustrates a system 400 that facilitates a hybrid QKD link according to one or more embodiments of the present disclosure. The system 400 includes the QSFP network interface module 102, the optical communication channel 104, the NIC 118, and/or a QSFP network interface module 402. For instance, the QSFP network interface module 102 can be a first QSFP network interface module and the QSFP network interface module 402 can be a second QSFP network interface module. Furthermore, the QSFP network interface module 102 and the QSFP network interface module 402 can be coupled via the optical communication channel 104. In an embodiment, the QSFP network interface module 102 includes the VCSEL 106, the VCSEL 108, the mirror 114, and/or the mirror 116. In certain embodiments, the QSFP network interface module 102 additionally includes the filter 202. In certain embodiments, the GPU 302 is additionally coupled to the QSFP network interface module 102. In one or more embodiments, the QSFP network interface module 102 is coupled to the optical communication channel 104. Additionally, in one or more embodiments, the QSFP network interface module 402 is coupled to the optical communication channel 104. In an embodiment, the QSFP network interface module 102 can be a first transceiver device (e.g., a first optical transceiver) coupled to the optical communication channel 104 and the QSFP network interface module 402 can be a second transceiver device (e.g., a second optical transceiver) coupled to the optical communication channel 104. In certain embodiments, the QSFP network interface module 102 can be employed as a transmitter device that transmits data (e.g., communication data) and/or one or more quantum keys (e.g., one or more QKD keys) to the QSFP network interface module 402 (e.g., a receiver device) via the optical communication channel 104. For example, in one or more embodiments, the QSFP network interface module 402 can receive the optical signal 110 and/or the QKD optical signal 112 (e.g., the optical signal 110 and/or the QKD optical signal 112 transmitted by the QSFP network interface module 102) via the optical communication channel 104. In one or more embodiments, the QSFP network interface module 402 can be configured similar to the QSFP network interface module 102. For example, in an embodiment, the QSFP network interface module 402 can include a second set of the VCSEL 106, the VCSEL 108, the mirror 114, and/or the mirror 116. In certain embodiments, the QSFP network interface module 102 can additionally include a second version of the filter 202. In certain embodiments, second version of the NIC 118 and/or the GPU 302 can be coupled to the QSFP network interface module 402. In one or more embodiments, the QSFP network interface module 402 can be configured based on a QKD protocol associated with the QSFP network interface module 102.

FIG. 5 illustrates a module pad layout 500 that facilitates a hybrid QKD link according to one or more embodiments of the present disclosure. For example, the module pad layout 500 can illustrate a top side viewed from the top for a module pad employed by the QSFP network interface module 102. In an embodiment, the module pad layout 500 can correspond to a module pad (e.g., a serial communication interface) of the QSFP network interface module 102 that is connected to the optical communication channel 104. In an aspect, the module pad layout 500 can be a module-host electrical interface. In another aspect, the module pad layout 500 can be configured to provide QKD key transfer functionality (e.g., without altering legacy communication functionality for a QSFP-DD network interface module). In one or more embodiments, the module pad layout 500 includes Legacy QSFP28 pads 502 and additional QSFP-DD pads 504. In one or more embodiments, the Legacy QSFP28 pads 502 can be contact pads (e.g., to facilitate electrical interconnections) associated with classical network communication and the additional QSFP-DD pads 504 can be contact pads (e.g., to facilitate electrical interconnections) associated with quantum communication. In an embodiment, the Legacy QSFP28 pads 502 can facilitate transmission of the optical signal 110 via the optical communication channel 104. Furthermore, the additional QSFP-DD pads 504 can facilitate transmission of the QKD optical signal 112 via the optical communication channel 104. In a non-limiting embodiment, the Legacy QSFP28 pads 502 can be legacy QSFP28 pads and the additional QSFP-DD pads 504 can be QSFP-DD pads. However, it is to be appreciated that, in certain embodiments, the Legacy QSFP28 pads 502 and/or the additional QSFP-DD pads 504 can be different type of module pads. As such, with the module pad layout 500, the QSFP network interface module 102 can provide transmission of both the optical signal 110 and the QKD optical signal 112 via the optical communication channel 104. For example, with the module pad layout 500, the QSFP network interface module 102 can provide transmission of both data related to one or more communications and one or more quantum keys (e.g., one or more QKD keys) via the optical communication channel 104. In one or more embodiments, the QKD optical signal 112 (e.g., the one or more quantum keys) can be transmitted via a management interface associated with the additional QSFP-DD pads 504. In one or more embodiments, with the module pad layout 500, a network device can detect that a pluggable transceiver with QKD capability has been attached to the network device and the network device can enable a communication interface according to the module pad layout 500 (e.g. according to a configuration of the Legacy QSFP28 pads 502 and/or the additional QSFP-DD pads 504). As such, a network device can be backwards compatible with one or more QSFP network interface modules by employing the additional QSFP-DD pads 504. In one or more embodiments, the additional QSFP-DD pads 504 can leverage one or more previously unused module pads such as, for example, module pads #66 and #69 in QSFP-DD form factor. In one or more embodiments, the additional QSFP-DD pads 504 can additionally or alternatively leverage one or more vendor specific module pads. In one or more embodiments, the additional QSFP-DD pads 504 can transmit QKD key information through a management interface. For example, in one or more embodiments, the additional QSFP-DD pads 504 can transmit QKD key information via a serial communication interface (e.g., a two-wire serial communication interface) such as, for example, pins SDA and SCL for QSFP, OSFP and/or QSFP-DD form factors. In one or more embodiments related to a host system implementation compatible with the QSFP network interface module 102, the host system can detect that a pluggable network interface module with QKD capability has been attached to the host system and/or can enable the communication interface according to the module pad layout 500. Therefore, the host system can be backwards compatible with other vendors (e.g., multi-source agreement (MSA)-compatible) and/or can be QKD compatible when a compliant module (e.g., the QSFP network interface module 102) is connected.

FIG. 6 illustrates a module pad layout 600 that facilitates a hybrid QKD link according to one or more embodiments of the present disclosure. The module pad layout 600 can illustrate a bottom side viewed from the bottom for a module pad employed by the QSFP network interface module 102. For example, in an embodiment, the module pad layout 600 can illustrate a bottom side viewed from the bottom for a module pad employed by the QSFP network interface module 102 and the module pad layout 500 can illustrate a top side viewed from the top for the module pad employed by the QSFP network interface module 102. In an embodiment, the module pad layout 600 can correspond to a module pad (e.g., a serial communication interface) of the QSFP network interface module 102 that is connected to the optical communication channel 104. In one or more embodiments, the module pad layout 600 can be employed in combination with the module pad layout 500. In an aspect, the module pad layout 600 can be a module-host electrical interface. In another aspect, the module pad layout 600 can be configured to provide QKD key transfer functionality (e.g., without altering legacy communication functionality for a QSFP network interface module). In one or more embodiments, the module pad layout 600 includes additional QSFP-DD pads 602 and Legacy QSFP28 pads 604. In one or more embodiments, the Legacy QSFP28 pads 604 can be contact pads (e.g., to facilitate electrical interconnections) associated with classical network communication and the additional QSFP-DD pads 602 can be contact pads (e.g., to facilitate electrical interconnections) associated with quantum communication. In an embodiment, the Legacy QSFP28 pads 604 can facilitate transmission of the optical signal 110 via the optical communication channel 104. Furthermore, the additional QSFP-DD pads 602 can be configured to facilitate transmission of the QKD optical signal 112 via the optical communication channel 104. In a non-limiting embodiment, the additional QSFP-DD pads 602 can be QSFP-DD pads and the Legacy QSFP28 pads 604 can be legacy QSFP28 pads. However, it is to be appreciated that, in certain embodiments, the additional QSFP-DD pads 602 and/or the Legacy QSFP28 pads 604 can be different type of module pads. As such, with the module pad layout 600, the QSFP network interface module 102 can provide transmission of both the optical signal 110 and the QKD optical signal 112 via the optical communication channel 104. For example, with the module pad layout 600, the QSFP network interface module 102 can provide transmission of both data related to one or more communications and one or more quantum keys (e.g., one or more QKD keys) via the optical communication channel 104. In one or more embodiments, the QKD optical signal 112 (e.g., the one or more quantum keys) can be transmitted via a management interface associated with the additional QSFP-DD pads 602. In one or more embodiments, with the module pad layout 600, a network device can detect that a pluggable transceiver with QKD capability has been attached to the network device and the network device can enable a communication interface according to the module pad layout 600 (e.g. according to a configuration of the Legacy QSFP28 pads 604 and/or the additional QSFP-DD pads 602). As such, a network device can be backwards compatible with one or more QSFP network interface modules by employing the additional QSFP-DD pads 602. In one or more embodiments, the additional QSFP-DD pads 602 can leverage one or more previously unused module pads such as, for example, module pads #46 in QSFP-DD form factor. In one or more embodiments, the additional QSFP-DD pads 602 can additionally or alternatively leverage one or more vendor specific module pads such as, for example, VS1-3 pads #47, #49 and #50 in QSFP-DD form factor. In one or more embodiments, the additional QSFP-DD pads 602 can transmit QKD key information through a management interface. For example, in one or more embodiments, the additional QSFP-DD pads 602 can transmit QKD key information via a serial communication interface (e.g., a two-wire serial communication interface) such as, for example, pins SDA and SCL for QSFP, OSFP and/or QSFP-DD form factors. In one or more embodiments related to a host system implementation compatible with the QSFP network interface module 102, the host system can detect that a pluggable network interface module with QKD capability has been attached to the host system and/or can enable the communication interface according to the module pad layout 600. Therefore, the host system can be backwards compatible with other vendors (e.g., multi-source agreement (MSA)-compatible) and/or can be QKD compatible when a compliant module (e.g., the QSFP network interface module 102) is connected.

FIG. 7 is a flowchart illustrating an example method for facilitating quantum key distribution in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 7 may, for example, be performed by an example computing system 800 (shown in FIG. 8) that is embedded in a QSFP network interface module (e.g., the QSFP network interface module 102 and/or 402), a VCSEL (e.g., the VCSEL 106 and/or the VCSEL 108), and/or a NIC (e.g., the NIC 118). In some embodiments, the computing system 700 is a firmware computing system embedded in a QSFP network interface module (e.g., the QSFP network interface module 102 and/or 402), a VCSEL (e.g., the VCSEL 106 and/or the VCSEL 108), and/or a NIC (e.g., the NIC 118). In one or more embodiments, one or more of the operations illustrated in FIG. 7 may, for example, be performed by a QSFP network interface module (e.g., the QSFP network interface module 102 and/or 402), a VCSEL (e.g., the VCSEL 106 and/or the VCSEL 108), and/or a NIC (e.g., the NIC 118). In one or more embodiments, at operation 702, the computing system 800 controls emission of a first optical signal associated with data via a first vertical cavity surface emitting laser (VCSEL) of a network interface module. The network interface module can be, for example, a QSFP network interface module (e.g., the QSFP network interface module 102). In one or more embodiments, at operation 704, the computing system 800 controls emission of a second optical signal associated with quantum key distribution (QKD) via a second VCSEL of the network interface module. In an embodiment, the second VCSEL can be configured as a source for QKD. In one or more embodiments, at operation 706, the computing system 800 manages transmission of the first optical signal and the second optical signal via an optical communication channel coupled to the network interface module.

FIG. 8 illustrates the computing system 800 that may be embedded in a datacenter network system. In some cases, the computing system 800 may be a firmware computing system communicatively coupled with, and configured to control, one or more circuit modules associated with a network interface module (e.g., a QSFP network interface module). For example, the computing system 800 may be a firmware computing system and/or a controller computing system communicatively coupled with one or more circuit modules, such as a QSFP network interface module (e.g., the QSFP network interface module 102 and/or 402), a VCSEL (e.g., the VCSEL 106 and/or the VCSEL 108), and/or a NIC (e.g., the NIC 118). The computing system 800 may include or otherwise be in communication with a processor 810, a memory circuitry 820, and communication circuitry 830. In some embodiments, the processor 810 (which may include multiple or co-processors or any other processing circuitry associated with the processor) may be in communication with the memory circuitry 820. The memory circuitry 820 may comprise non-transitory memory circuitry and may include one or more volatile and/or non-volatile memories. In some examples, the memory circuitry 820 may be an electronic storage device (e.g., a computer readable storage medium) configured to store data that may be retrievable by the processor 810. In some examples, the data stored in the memory 820 may include classical communication protocol data and/or quantum communication protocol data, or the like for enabling the apparatus to carry out various functions or methods in accordance with embodiments of the present invention, described herein.

In some examples, the processor 810 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 810 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading. In some embodiments, the processor 810 is a microprocessor.

In an example embodiment, the processor 810 may be configured to execute instructions, such as computer program code or instructions, stored in the memory circuitry 820 or otherwise accessible to the processor 810. Alternatively or additionally, the processor 810 may be configured to execute hard-coded functionality. As such, whether configured by hardware or software instructions, or by a combination thereof, the processor 810 may represent a computing entity (e.g., physically embodied in circuitry) configured to perform operations according to an embodiment of the present invention described herein. For example, when the processor 810 is embodied as an ASIC, FPGA, or similar, the processor may be configured as hardware for conducting the operations of an embodiment of the invention. Alternatively, when the processor 810 is embodied to execute software or computer program instructions, the instructions may specifically configure the processor 810 to perform the algorithms and/or operations described herein when the instructions are executed. However, in some cases, the processor 810 may be a processor of a device (e.g., a mobile terminal or a fixed computing device) specifically configured to employ an embodiment of the present invention by further configuration of the processor using instructions for performing the algorithms and/or operations described herein. The processor 810 may further include a clock, an arithmetic logic unit (ALU) and logic gates configured to support operation of the processor 810, among other things.

The computing system 800 may optionally also include the communication circuitry 830. The communication circuitry may be any means embodied in either hardware or a combination of hardware and software that is configured to receive and/or transmit data from/to a network and/or any other device or module in communication with the computing system 800. In this regard, the communication interface may include, for example, supporting hardware and/or software for enabling communications. As such, for example, the communication circuitry 830 may include a communication modem and/or other hardware/software for supporting communication via cable, universal serial bus (USB), integrated circuit receiver, or other mechanisms.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system, comprising:
a first vertical cavity surface emitting laser (VCSEL) configured to emit a first optical signal associated with data;
a second VCSEL configured to emit a second optical signal associated with quantum key distribution (QKD); and
a network interface controller configured to manage transmission of the first optical signal associated with the first VCSEL and the second optical signal associated with the second VCSEL via an optical communication channel coupled to a network interface module,
wherein the network interface controller is configured to compare measurement of states of qubits associated with the second optical signal to facilitate the transmission of the first optical signal and the second optical signal.

2. The system of claim 1, wherein the network interface controller is configured to manage transmission of the first optical signal and the second optical signal based on a filter configured to filter the second optical signal.

3. The system of claim 1, wherein the network interface controller is configured to select the first optical signal or the second optical signal for transmission as an output optical signal via the optical communication channel.

4. The system of claim 1, wherein the network interface controller is configured to measure an electrical characteristic of a photodiode of the second VCSEL, and wherein the network interface controller is configured to manage the transmission of the first optical signal and the second optical signal based on the electrical characteristic measured.

5. The system of claim 1, wherein the network interface controller is configured to perform error correction with respect to the first optical signal to facilitate the transmission of the first optical signal and the second optical signal.

6. The system of claim 1, wherein the network interface controller is configured to manage the transmission of the first optical signal and the second optical signal based on a BB84 QKD protocol, a T12 QKD protocol, or a coherent one way (COW) QKD protocol.

7. The system of claim 1, wherein the network interface controller is configured to perform a first QKD communication process associated with the second VCSEL, and wherein the system further comprises:
a graphics processing unit configured to perform a second QKD communication process associated with the second VCSEL.

8. The system of claim 1, further comprising:
a quad small form-factor pluggable (QSFP) device that comprises the first VCSEL and the second VCSEL.

9. The system of claim 1, wherein the system is a transceiver device.

10. A system, comprising:
a first network interface module that comprises:
a first vertical cavity surface emitting laser (VCSEL) configured to emit a first optical signal associated with data; and
a second VCSEL configured to emit a second optical signal associated with quantum key distribution (QKD); and
a network interface controller configured to manage transmission of the first optical signal associated with the first VCSEL and the second optical signal associated with the second VCSEL via an optical communication channel coupled to a second network interface module,
wherein the network interface controller is configured to compare measurement of states of qubits associated with the second optical signal to facilitate the transmission of the first optical signal and the second optical signal.

11. The system of claim 10, wherein the first network interface module is a quad small form-factor pluggable (QSFP) network interface module.

12. The system of claim 10, wherein the first network interface module further comprises:
a filter configured to filter configured to filter the second optical signal to facilitate the transmission of the first optical signal or the second optical signal via the optical communication channel.

13. The system of claim 10, wherein the network interface controller is configured to select the first optical signal or the second optical signal for transmission as an output optical signal via the optical communication channel.

14. The system of claim 10, wherein the network interface controller is configured to compare measurement of states of qubits associated with the second optical signal to facilitate the transmission of the first optical signal and the second optical signal.

15. The system of claim 10, wherein the network interface controller is configured to perform error correction with respect to the first optical signal to facilitate the transmission of the first optical signal and the second optical signal.

16. The system of claim 10, wherein the network interface controller is configured to manage the transmission of the first optical signal and the second optical signal based on a BB84 QKD protocol, a T12 QKD protocol, or a coherent one way (COW) QKD protocol.

17. The system of claim 10, wherein the network interface controller is configured to perform a first QKD communication process associated with the second VCSEL, and wherein the system further comprises:
a graphics processing unit configured to perform a second QKD communication process associated with the second VCSEL.

18. A method, comprising:
controlling emission of a first optical signal associated with data via a first vertical cavity surface emitting laser (VCSEL) of a network interface module;
controlling emission of a second optical signal associated with quantum key distribution (QKD) via a second VCSEL of the network interface module; and
managing transmission of the first optical signal and the second optical signal via an optical communication channel coupled to the network interface module,
wherein the network interface controller is configured to compare measurement of states of qubits associated with the second optical signal to facilitate the transmission of the first optical signal and the second optical signal.

19. The method of claim 18, wherein the network interface controller is configured to select the first optical signal or the second optical signal for transmission as an output optical signal via the optical communication channel.

20. The method of claim 18, wherein the network interface controller is configured to manage transmission of the first optical signal and the second optical signal based on a filter configured to filter the second optical signal.

* * * * *